(12) United States Patent
Quinn et al.

(10) Patent No.: US 10,017,299 B2
(45) Date of Patent: Jul. 10, 2018

(54) REUSABLE COLLAPSIBLE BASKET WITH A PACKING WRAP STRAP

(71) Applicant: CleverMade, LLC, Carlsbad, CA (US)

(72) Inventors: Thomas A. Quinn, Carlsbad, CA (US); Michael Carlson, Carlsbad, CA (US)

(73) Assignee: Clevermade, LLC, Carlsbad, CA (US)

( * ) Notice: Subject to any disclaimer, the term of this patent is extended or adjusted under 35 U.S.C. 154(b) by 0 days.

(21) Appl. No.: 14/723,172

(22) Filed: May 27, 2015

(65) Prior Publication Data
US 2016/0347502 A1    Dec. 1, 2016

(51) Int. Cl.
| | |
|---|---|
| A45C 7/00 | (2006.01) |
| B65D 21/08 | (2006.01) |
| B65D 25/28 | (2006.01) |
| A45C 3/04 | (2006.01) |
| D06F 95/00 | (2006.01) |
| B65D 37/00 | (2006.01) |

(52) U.S. Cl.
CPC .............. B65D 21/086 (2013.01); A45C 3/04 (2013.01); A45C 7/0077 (2013.01); B65D 25/2852 (2013.01); B65D 37/00 (2013.01); D06F 95/002 (2013.01); Y02W 30/807 (2015.05)

(58) Field of Classification Search
CPC ............................ B65D 21/086; A45C 7/0077
See application file for complete search history.

(56) References Cited

U.S. PATENT DOCUMENTS

| | | | | |
|---|---|---|---|---|
| 2004/0040960 A1* | 3/2004 | Gledhill | ............... | B65D 21/086 220/23.4 |
| 2007/0175892 A1* | 8/2007 | Izumi | ................. | B65D 25/2879 220/9.4 |
| 2008/0053995 A1* | 3/2008 | Wang | ................... | B65D 21/068 220/9.2 |
| 2008/0087676 A1* | 4/2008 | Kasboske | ............ | B65D 21/086 220/666 |
| 2012/0057809 A1* | 3/2012 | Buller | .................. | A45C 7/0077 383/2 |
| 2013/0216158 A1* | 8/2013 | Meldeau | ................... | A45C 3/04 383/24 |
| 2014/0023295 A1* | 1/2014 | Wagner | ................ | A45C 7/0077 383/4 |

FOREIGN PATENT DOCUMENTS

EP    2550891 A1    1/2013

* cited by examiner

*Primary Examiner* — Andrew T Kirsch
*Assistant Examiner* — Don M Anderson
(74) *Attorney, Agent, or Firm* — Umberg Zipser LLP

(57) ABSTRACT

The present invention provides, in at least one embodiment, a basket such as a grocery basket or laundry basket, where the basket includes a packaging wrap strap. When the basket is in an open position, the wrap strap is flush to the bottom side of the base of the basket such that it is out of the way. When the basket is in a closed position, the wrap strap, made from elastic, stretches to get around the base of the basket and pulls the base upwards while applying downward force on a rim of the basket to keep the basket closed very flat. The wrap strap advantageously does not interfere with the closing and opening functions, improves storage and carrying, and provides better packaging.

17 Claims, 3 Drawing Sheets

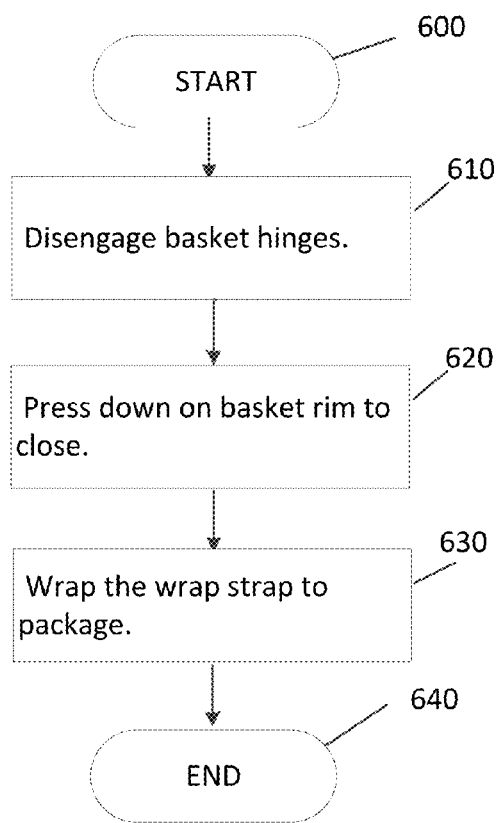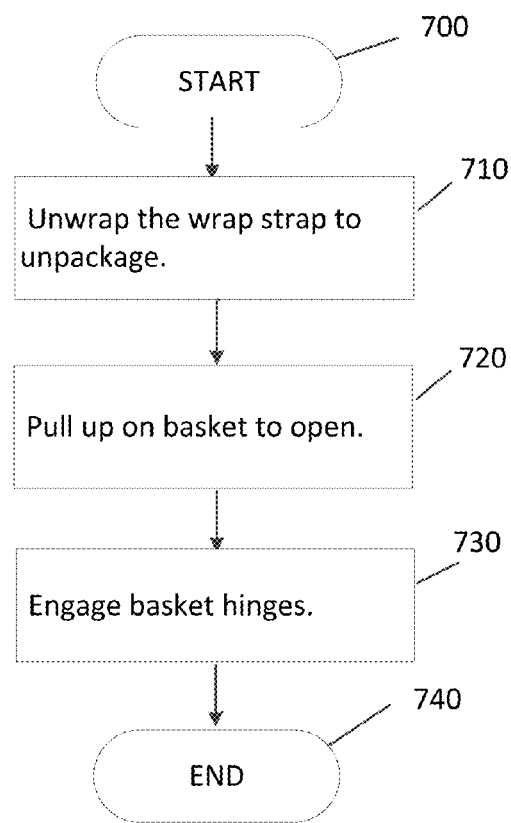
Fig. 6
Fig. 7

REUSABLE COLLAPSIBLE BASKET WITH A PACKING WRAP STRAP

BACKGROUND OF THE INVENTION

1. Field of Invention

The invention relates generally to grocery bags and laundry baskets, and more particularly, to an improved reusable collapsible basket with improved packaging capabilities.

2. Description of Related Art

A basket is a container for holding, storing, and transporting items within the basket. Baskets can be made from a range of materials and sometimes can have a lid or a handle. One type of basket is a reusable shopping bag, which is a shopping bag that is designed to be reused many times and is an alternative to single-use paper or plastic bags.

A reusable shopping bag can also be used as a cart replacement during shopping, typically at a supermarket, for customers to transport merchandise to the check-out counter and to their car and home. Reusable shopping bags are often made from a fabric such as canvas, woven synthetic fibers, or a thick plastic that is more durable than a disposable plastic bag to allow for multiple reuses. Reusable bags are known for their environmental benefits, as a customer who relies on only reusable bags for supermarket purchases is likely to save hundreds of plastic bags per year. Another benefit is the savings from the cost of plastic bags and associated government taxation. A further benefit is cosmetic, in that the reusable bags often have better designs along with a more eco-friendly look.

A problem with reusable bags is that many customers still do not use them. Although reusable bag usage has gradually increased over the past twenty years in view of environmental and costs concerns, most grocery store customers still do not own their own bags. And even out of the customers who own reusable bags, many of them go unused. One reason for this may be convenience. As such it would be desired to have a reusable bag that can be stored away better, carrier easier, and function better.

SUMMARY OF THE INVENTION

The present invention provides, in at least one embodiment, a basket such as a grocery basket or laundry basket, that includes a packaging wrap strap. The wrap strap has two ends that attach to the bottom side of the base of the basket and the wrap strap lies flush to the bottom side of the base such that the wrap strap is out of the way when the basket is open. The wrap strap is also made from elastic to stretch to get around the base of the basket and to apply downward force on the basket to keep the basket closed flat. The wrap strap advantageously does not interfere with the closing and opening functions, provides improves storage and easier carrying, and better packaging.

An advantage of the present invention is that the wrap strap does not interfere with the closing and opening functions of the basket. The wrap strap stays out of the way during operation, and disappears flush under the base of the basket when the basket is in the open position.

Another advantage is the wrap strap provides improved storage and carrying such that a customer would want to take the basket everywhere. Improved storage is provided because the strap is made from an elastic that can stretch to get around the base of the basket and apply a downward force on the closed basket to keep the basket closed very flat. Also advantageous, when the basket is in the closed position, the wrap strap provides a handle for easier carrying of the closed basket. Further, the wrap strap also allows the customer to carry the basket by the handles when the basket is closed, unlike without a wrap strap, because the strap wrap keeps the basket from accidentally being opened. This is because the wrap strap securely keeps the basket closed flat and prevents the basket from being snapped up and open.

A further advantage is the wrap strap provides better packaging. The wrap strap eliminates the need for exterior packaging and provides merchandising opportunities. For example, a merchant can sell 2 or 3 basket together as a unit because the wrap strap's downward force allows a merchant to tuck a plurality of closed baskets within. Further, a customer can carry several baskets together as a unit. The wrap strap also provides merchandising opportunities, as the wrap strap is an ideal location for product labeling or product instructions, which can further reduce the need for external packaging. The merchandising information can be located on one or both sides of the wrap strap.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows:

FIG. 6 illustrates the process of closing the basket according to an embodiment of the invention; and FIG. 7 illustrates the process of opening the basket according to an embodiment of the invention.

DETAILED DESCRIPTION OF EMBODIMENTS

Figure 1:
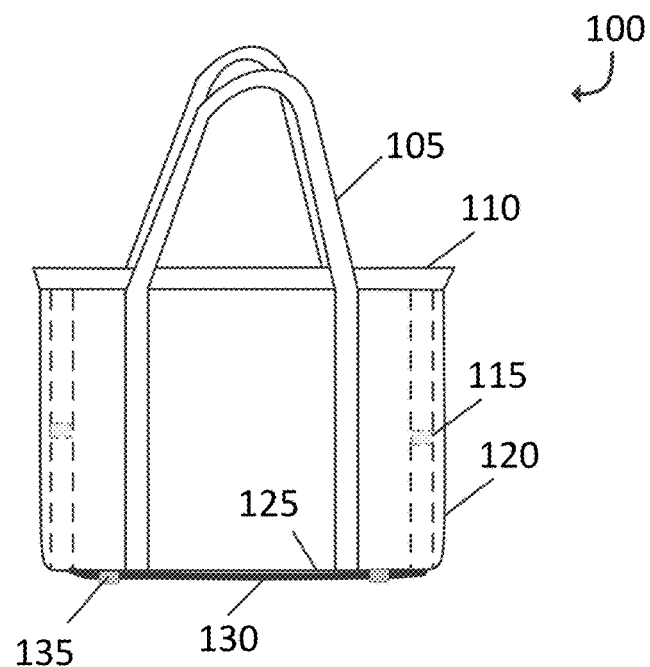
FIG. 1 illustrates a side view of a basket in an open position according to an embodiment of the invention.

Further features and advantages of the invention, as well as the structure and operation of various embodiments of the invention, are described in detail below with reference to the accompanying FIGS. 1-7, wherein like reference numerals refer to like elements. Although reusable collapsible baskets are typically used for supermarket shopping, the baskets can also be used for other carrying functions including those of a hamper such as a laundry basket.

Embodiments of the present invention provide a reusable collapsible basket with a packaging wrap strap. The basket has a closed position and an open position. In operation between the positions, the basket pops open in a snap and closes flat in a snap. The wrap strap stays out of the way during operation and when the basket is open, and when the basket is closed, the wrap strap's downward force keeps the basket closed very flat.

FIG. 1 illustrates a side view of a basket 100 in the open position according to an embodiment of the invention. The basket 100 includes handles 105, a rim 110, interior snap hinges 115, an exterior covering 120, a base 125, a wrap strap 130, and protrusions 135.

The basket 100 is sturdy enough to carry heavy items and will not tip over, unlike an unstructured bag. With the basket 100 in the open position, the wrap strap 130 is out of the way and barely visible below the base 125. The basket 100 can be a shopping basket, a laundry basket a beach basket, etc. The basket 100 is sturdy, collapsible, eco-friendly, and saves space when closed flat. The basket 100 can be referred to as a reusable collapsible basket, a snap basket, an ecobasket, etc.

The handles 105 provide a carrying function and are known by those with skill in the art. The handles 105 provide the customer the ability to carry the items within the basket 100 with one hand. The handles 105 and their connection to the basket 100 provide a heavy load capacity such that the basket 100 is strong enough to carry heavy items.

The rim 110, also referred to as a rigid upper frame, provides a sturdy structural opening for items to be placed within. The rim 100 also provides a structural connection point for the interior snap hinges 115 to connect to such that the basket 100 will not tip over. The rim 110 also provides structure for the exterior covering 120 to connect to, which keeps the items within the basket 100 and keeps the exterior covering 120 wide open. In one embodiment, the rim 110 is a circular metal bar that forms a rectangular shape with circled edges. The rectangular shape with circled edges is sometimes referred to instead as a rounded rectangle, a round corner rectangle, or a rectangle with rounded corners.

The interior snap hinges 115 vary the height of the basket 100 to open and close the basket 100. The interior snap hinges 115 also provide a connection between the rim 110 and the base 125 and provide the snap opening and closing features of the basket 100. In one embodiment, the snap hinges 115 are comprised of structural grade polymers. As with most hinges, the hinges 115 are comprised of two pieces and joined by a metal pin. The hinges 115 produce a "spring" effect upwards and "snap" sound upon the hinges 115 getting fully extended and also produce the snap sound upon the hinges starting to collapse. The spring effect and snap sound are caused by a short section of spring steel which is inserted into a slot of each of the two hinges 115. The interior snap hinges 115 engage and open the basket 100 by the customer pressing the center of the hinges 115 outward or by a quick upward pull to the handles 105 or the rim 110. The interior snap hinges 115 disengage and close the basket 100 when the customer presses the center of the hinges 115 inward. The interior snap hinges 115 are made of plastic and do not present a safety risk of pinching the customer's hand. The interior snap hinges 115 are very easy to open and close, literally making a snapping sound as the interior snap hinges 115 snap open and close.

The exterior covering 120 encloses the items in the basket 100. When the basket is open, the exterior covering 120 is stretched firm by the rim 110 and the base 125, providing a sturdy enclosure. The exterior covering 120 can be made from a tear resistant polyester fabric that is easy to clean. In one embodiment, the exterior covering 120 has a 30 liter sized opening when the basket 100 is in the open position, with a width of 18.25 inches, a height of 11 inches, and a depth of 11.25 inches. When the basket 100 is closed, the exterior covering 120 tucks nicely inward due to the interior snap hinges 115, and the basket 100 is closed very flat due to the downward force caused by wrap strap 130.

The basket 100 can include a separate small zippered pouch (not shown) in the interior for holding keys, phone, and personal items. In one embodiment, this pouch is 9 inches wide by 7 inches long.

The base 125 provides a structural connection point for the interior snap hinges 115 and the exterior covering 120 to connect to. The base 125 serves as the foundation of the basket 100. In one embodiment, the base is made of a variety of materials, including but not limited to plastic, wood, metal, particle board or other composite materials. The base 125 also provides a connection surface in which to fasten the protrusions 135 that elevate the base 125 off the ground. The base 125 is a firm material such that heavy items do not clump together at the bottom of the basket 100.

The wrap strap 130 is also referred to as a packaging wrap strap because the wrap strap 130 provides packaging, storage, and carrying functions. The wrap strap 130 stays flush to the bottom of the base 125 such that the wrap strap 130 stays out of the way when the basket is open and when the customer opens and closes the basket 100. The wrap strap 130 and the base 125 are typically flush when the wrap strap 130 is not applying downward force to close the basket 100 flat, although a small gap is illustrated in FIG. 1 purely for illustration purposes, to show that the wrap strap 130 and the base 125 are two separate components. The wrap strap 130 includes an elastic belt like strap with two ends, where both ends connect to a bottom portion of the base 125. The wrap strap 130 can be made of any number of elastic materials as long as it elongates to serve its function, retains its memory over time, and resists sagging which may become unsightly and impact its effectiveness. By being elastic, the wrap strap 130 is able to stretch around the base 125 and to apply downward force to basket 100 in the closed position to make the basket 100 flat.

The protrusions 135, also referred to as integrated feet or feet, are attached to the base 125 and elevate the basket 100 off the ground. The protrusions 135 also make it easier to slide the basket 100 across a surface. In one embodiment, four protrusions 135 are attached near the four edges of the base 125. In other embodiments, five or six protrusions 135 are attached to the base 125.

Figure 2:
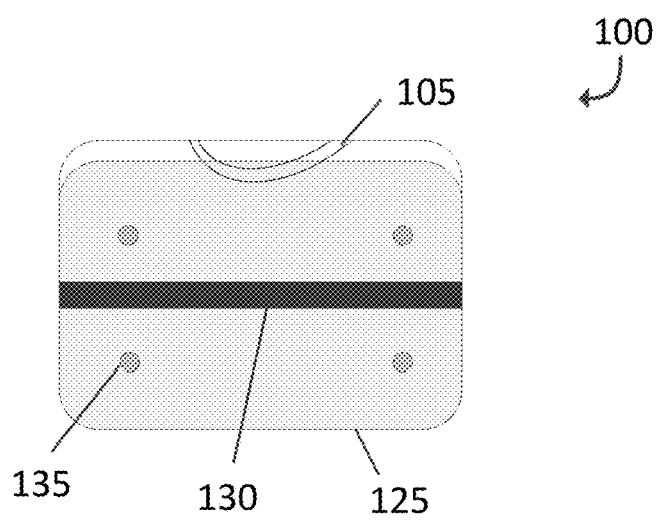
FIG. 2 illustrates a bottom view of the basket according to an embodiment of the invention.

FIG. 2 illustrates a bottom view of the basket 100 according to an embodiment of the invention. The bottom view provides a better view of the base 125, the wrap strap 130, and the protrusions 135. The base 125 is illustrated as a rectangular shape with circled edges, which requires the wrap strap 130, which is flush to the base 125 when the basket 100 is open, to stretch to get around the base 125, when the basket 100 is closed. Although the wrap strap 130 is illustrated as a thin elastic strap, a thicker strap could also be used without departing from the spirit of the invention. The protrusions 135 are spaced near the edges of the base 125 and elevate the basket 100 off a flat surface.

Figure 3:
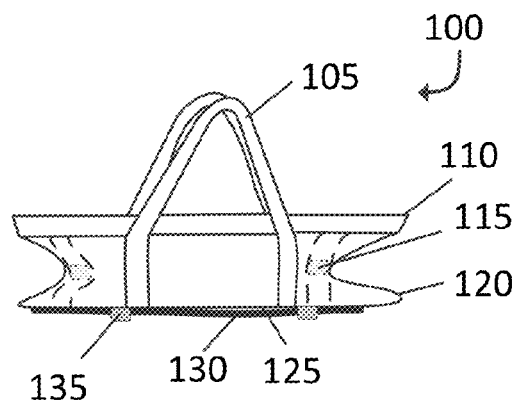
FIG. 3 illustrates the function of closing the basket according to an embodiment of the invention.

FIG. 3 illustrates the function of closing the basket 100 according to an embodiment of the invention. To close the basket 100, the customer depresses inward the internal snap hinges 115 such that the rim 110 drops down toward the base 125 and the internal snap hinges 115 tuck the exterior covering 120 inward. To open the basket 100, the customer snaps up the handles 105 or the rim 110, or presses outward the interior snap hinges 115. During the operation of opening and closing the basket 100, the wrap strap 130 stays out of the way between the protrusions 135 under the base 125.

Figure 4:
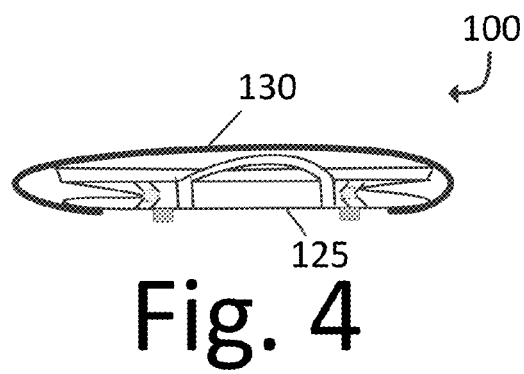
FIG. 4 illustrates the basket in a closed position according to an embodiment of the invention.

FIG. 4 illustrates the basket 100 in a closed position according to an embodiment of the invention. After the basket 100 is collapsed down, the wrap strap 130 is stretched around the base 125 and on to the top of the basket 100. The elastic on the wrap strap 130 applies a downward force to the rim 110 and an upward force to the base 125 to close the basket 100 very flat.

Figure 5:
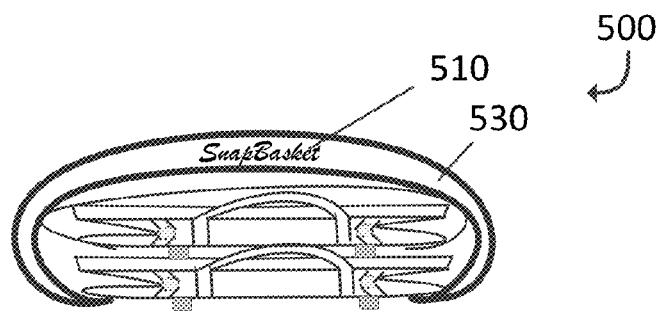
FIG. 5 illustrates a plurality of closed baskets with merchandizing according to an embodiment of the invention.

FIG. 5 illustrates a plurality of closed baskets 500 with merchandizing 510 according to an embodiment of the invention. The wrap strap 530 provides a location for merchandizing 510, such as a product logo, instructions, labeling, or marketing, which can further reduce the need for external packaging. The merchandising 510 can be located on one or both sides of the wrap strap 130.

Additionally, the wrap strap's downward force on the baskets 500 in the closed position allows one or more additional baskets to be tucked within. For example, a merchant can sell 2 or 3 basket together as a unit and the wrap strap 530 eliminates the need for external packaging. Also, the customer can store the baskets 500 in their car or home improving storage. Further, the wrap strap 130 improves carrying, as the wrap strap 130 acts as a handle such that the customer can carry the baskets 500 together.

FIG. 6 illustrates the process of closing the basket 100 according to an embodiment of the invention. The process starts at step 600. At step 610, the customer disengages the basket's interior snap hinges 115 by pressing inward on the interior snap hinges 115. At step 620, the customer presses down on the basket's rim 110 to close the basket 100, although this step is not needed if gravity provides enough downward force. At step 630, the customer wraps the wrap strap 130 around the rim 110 to flatten and completely package the basket 100. The process ends at step 640.

FIG. 7 illustrates the process of opening the basket 100 according to an embodiment of the invention. The process starts at step 700. At step 710, the customer unwraps the wrap strap 130 to unpackage the basket 100. At step 720, the customer pulls up on the basket's rim 110 or handles 105 or presses outward on the interior snap hinges 115 to open the basket 100. At step 730, the customer engages the basket's interior snap hinges 115 by pressing outward on the interior snap hinges 115, although this step is not needed if the interior snap hinges 115 were engaged when the customer pulled up on the basket 100. The process ends at step 740. Although FIGS. 6-7 are described with respect to basket 100, the process would also work with the plurality of baskets 500.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A set of baskets, comprising:
   first and second baskets, each of which comprises
      a rim comprising an upper surface of the basket, wherein the rim comprises a rigid frame having a fixed length and width;
      a base comprising a lower surface of the basket when in an open position and a closed position, wherein the base comprises a bottom side and a top side with the top side facing the rim;
      an exterior covering that is attached to the rim and the base and folds inwardly when the basket collapses to a closed position;
      a stretchable and continuous wrap strap formed from a single piece of material that extends from a first end to a second end that are disposed at opposite ends of the wrap strap, and the wrap strap is permanently affixed to the lower surface of the base at only the first and second ends, and wherein the stretchable, continuous wrap strap is configured to abut the bottom side of the base when unstretched;
      wherein the rim is configured to collapse vertically onto the top side of the base in a closed configuration, such that the rigid frame is disposed vertically above the top side of the base; and
      wherein the stretchable, continuous wrap strap is (a) continuous and flush along the bottom side of the base from the first end to the second end when the basket is in the open position, and (b) when in the closed position the wrap strap is configured to stretch and wrap around the rim and the top side of the base while the first end and the second end remain attached to the base, such that (i) the wrap strap ceases being flush along the bottom side of the base and (ii) retraction of the wrap strap automatically applies a downward force on a top surface of the rigid frame to collapse the rigid frame toward the base and maintain the closed configuration; and
   wherein the stretchable, continuous wrap strap of the first basket is further configured to wrap about the first and second baskets when the first and second baskets are in the closed position, such that the wrap strap of the first basket applies a downward force on a top surface of the rigid frame of the second basket to maintain the first basket and the second basket in the closed configuration.

2. The set of baskets of claim 1, wherein the first basket further comprises a hinge that is attached to the rim and the base to open and close the first basket.

3. The set of baskets of claim 2, wherein the hinge is configured to collapse the rim onto the top side of the base of the first basket in the closed configuration and extend the rim away from the top side of the base to transition the first basket from the closed configuration to an open configuration.

4. The set of baskets of claim 3, wherein the rim and base of the first basket are configured to collectively stretch the exterior covering when the first basket is in the open configuration.

5. The set of baskets of claim 1, wherein the wrap strap of the first basket is configured to apply an upward force on the base of the first basket when in the closed configuration.

6. The set of baskets of claim 1, wherein the base of the first basket comprises a firm material having a fixed length and width.

7. The set of baskets of claim 1, wherein the first basket further comprises a handle attached to the rim.

8. The set of baskets of claim 1, wherein the wrap strap of the first basket comprises a packaging wrap strap.

9. The set of baskets of claim 1, wherein the first basket comprise a reusable collapsible basket.

10. The set of baskets of claim 1, wherein the first basket comprises a grocery basket or a laundry basket.

11. The set of baskets of claim 1, wherein the first basket further comprises
a first hinge coupled to the rim and the base of the first basket, wherein the first hinge is configured to collapse into the internal cavity to thereby transition the first basket from an open position to a closed position.

12. The set of baskets of claim 1, wherein the rim of the first basket comprises a metal bar.

13. The set of baskets of claim 11, wherein the first basket further comprises a second hinge coupled to the rim and the base of the first basket, wherein the second hinge is configured to collapse into the internal cavity to thereby transition the first basket from the open position to the closed position.

14. The set of baskets of claim 11, wherein the first basket further comprises a first protrusion and a second protrusion coupled to the base of the first basket.

15. The set of baskets of claim 14, wherein the wrap strap of the first basket extends between the first protrusion and the second protrusion when the first basket is in the open position.

16. The set of baskets of claim 11, wherein the first basket further comprises a handle that is attached to the rim of the first basket.

17. The set of baskets of claim 1, wherein the first end and the second end of the wrap strap of the first basket are each attached to an outer rim of the base of the first basket.

* * * * *